US008774046B2

(12) United States Patent
Wang et al.

(10) Patent No.: US 8,774,046 B2
(45) Date of Patent: Jul. 8, 2014

(54) METHOD AND DEVICE FOR COUNTING TRAFFIC AND AUTOMATICALLY CALCULATING A COST OF SURFING A NETWORK (75) Inventors: Ting Wang, Shenzhen (CN); Xinqi Wu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 399 days.

(21) Appl. No.: 13/257,922

(22) PCT Filed: Aug. 21, 2009

(86) PCT No.: PCT/CN2009/073403
§ 371 (c)(1),
(2), (4) Date: Dec. 5, 2011

(87) PCT Pub. No.: WO2010/142087
PCT Pub. Date: Dec. 16, 2010

(65) Prior Publication Data
US 2012/0082059 A1   Apr. 5, 2012

(30) Foreign Application Priority Data

Jun. 12, 2009  (CN) .......................... 2009 1 0147808

(51) Int. Cl.
H04W 4/26     (2009.01)
(52) U.S. Cl.
USPC .......................................................... 370/253
(58) Field of Classification Search
CPC ...................................................... H04W 4/26
See application file for complete search history.

(56) References Cited

U.S. PATENT DOCUMENTS

2003/0125013 A1* 7/2003 Mizell et al. .................. 455/408

2006/0155994 A1    7/2006  Sun

FOREIGN PATENT DOCUMENTS

| CN | 1395391 A | 2/2003 |
|----|-----------|--------|
| CN | 1497909 A | 5/2004 |
| CN | 1567819 A | 1/2005 |
| CN | 1798043 A | 7/2006 |

(Continued)

OTHER PUBLICATIONS

International Search Report in international application No. PCT/CN2009/073403, mailed on Mar. 25, 2010.

(Continued)

Primary Examiner — Sulaiman Nooristany
(74) Attorney, Agent, or Firm — Oppedahl Patent Law Firm LLC (57) ABSTRACT The present disclosure discloses a method for traffic counting, in which an address space for storing the traffic data of a user is allocated in a wireless network card. The method includes the following steps of: within a preset counting period, counting uplink traffic and downlink traffic after the wireless network card accesses the network, and updating the traffic data of the current online user stored in the address space of the wireless network card. The present disclosure also provides a method for automatically calculating a cost of surfing a network, including the following steps of: monitoring updated charging standards in real time or periodically; within a preset counting period, counting uplink traffic and downlink traffic and updating the traffic data corresponding to the current user; and within a preset charging period, calculating the current cost of surfing a network of the current day or the current month according to a charging standard for surfing the network and the traffic data of the current user. Accordingly, the present disclosure further provides a device for traffic counting and a device for automatically calculating a cost of surfing a network.

9 Claims, 5 Drawing Sheets

(56) References Cited

FOREIGN PATENT DOCUMENTS

| CN | 101005381 A | 7/2007 |
|---|---|---|
| CN | 101127632 A | 2/2008 |
| CN | 101150415 A | 3/2008 |
| CN | 101197687 A | 6/2008 |
| CN | 101459523 A | 6/2009 |
| CN | 101600186 A | 12/2009 |
| JP | 2000049774 A | 2/2000 |
| JP | 2002271324 A | 9/2002 |
| JP | 2002298092 A | 10/2002 |
| JP | 2002300075 A | 10/2002 |
| JP | 2004253907 A | 9/2004 |
| JP | 2004312688 A | 11/2004 |
| KR | 20080063915 A | 7/2008 |
| WO | 2006086676 A2 | 8/2006 |

OTHER PUBLICATIONS

English Translation of the Written Opinion of the International Search Authority in international application No. PCT/CN2009/073403, mailed on Mar. 25, 2010.
Aaron Weiss, "How to: Monitor Bandwidth with Tomato Firmware", copy from website [http://www.wi-fiplanet.com/ tutorials/article.php/3794171/How-to-Monitor-Bandwidth-with-Tomato-Firmware.htm], Jan. 5, 2009. (5 pages—see entire document).
Weiss, A. , How to: Monitor Bandwidth with Tomato Firmware, Wi-Fi Planet Tutorials Jan. 5, 2009.

\* cited by examiner

METHOD AND DEVICE FOR COUNTING TRAFFIC AND AUTOMATICALLY CALCULATING A COST OF SURFING A NETWORK

TECHNICAL FIELD

The present disclosure relates to a field of a charging technology for wireless network, and particularly to a method and device for traffic counting and automatically calculating a cost of surfing a network.

BACKGROUND

With the wireless network getting more and more popular, more and more users begin to access the network with a wireless network card. However, one wireless network card is usually used on several computers, making the traffic counting of surfing the network with a wireless network card more difficult. The traffic of surfing the network is currently counted by a traffic counting software equivalent to a network traffic monitor (DU Meter). Such traffic counting software stores the result of a traffic counting locally, so in the case where a wireless network card is configured to access the network on multiple computers, such traffic counting software cannot accurately count the actual traffic of surfing the network with a wireless network card.

At present, in order to count the traffic of surfing the network, Chinese Patent Application No. 200610124026.2 has provided a method for a network traffic counting. This application achieves traffic counting by requesting a subscription on network traffic, but only the traffic during this current connection. Moreover, the traffic acquired with this method is only stored locally. For a mobile wireless network card, if a user accesses the network through multiple computers with the same wireless network card, the total traffic of multiple network accesses of the same wireless network card cannot be counted by using this method.

The problem above makes it difficult for the user of a wireless network card to control the cost of surfing the network and pushes the user to inquiry the cost of surfing the network by telephoning the wireless network operator or by visiting the website of the wireless network operator, which often leads to a great difference in the cost of surfing the network estimated by the user and that charged by the wireless network operator, and further to a distrust of the user in the wireless network operator or even a complaint.

For this reason, the Chinese Patent Application No. 200310102404.3 provides a system for the authentication, authorization and billing of multiple Wireless Local Area Network (WLANs) operated by multiple WLAN operators, in which, when an authenticated user accesses the network, the authentication server instructs a billing server to start to calculate the cost of surfing the network; the fee calculation is ended when the user is offline, and the total fee is calculated according to the surfing fees. This patent can calculate the total cost of surfing the network for the current access of the user terminal in real time, but as the cost of surfing the network for each accessing is stored locally, for a user using one wireless network card to access the network through multiple computers, it is hard to accurately acquire the total cost of surfing the network of the current day and/or current month. Yet, the main reason why the user cares about traffic of surfing the network is that the user cares about their cost of surfing the network of the current day and/or the current month.

In addition, wireless network operators often update their charging standards, but users hardly acquire the up-to-date charging standards of their wireless network operators in time. The billing server disclosed in Chinese Patent Application No. 200310102404.3 cannot automatically update charging standards of wireless network operators. Therefore, when a wireless network operator changes a charging standard, if the fee is still calculated according to the former charging standard, the result will not be accurate any more.

It is thus clear that, the existing technologies are disadvantaged in that it is hard to accurately count the traffic of surfing the network with a wireless network card, which results in that it is hard to accurately calculate the cost of surfing the network, and it is also hard for the subscriber of a monthly payment service to know whether or not the traffic has exceeded a traffic quota.

SUMMARY

On this account, the present disclosure mainly aims to provide a method and device for traffic counting and automatically calculating the cost of surfing a network, where the network traffic can be accurately counted regarding the case that a user uses a same wireless network card to access the network through multiple computers.

To achieve the aim above, the present disclosure provides a method for traffic counting, in which an address space is allocated in a wireless network card to store the traffic data of a user. The method comprises the following steps of: within a preset counting period, counting uplink and downlink traffics after the wireless network card accesses the network, and updating the traffic data of a current online user stored in the address space of the wireless network card, wherein updating the traffic data of the current online user stored in the address space of the wireless network card may be as follows: updating the traffic data of the current online user stored in the address space of the wireless network card according to a date, a charging standard and the counted uplink and downlink traffics; specifically, this step may comprise: searching, according to a user name and a password used in the current access of the wireless network card to the network, the flash memory of the wireless network card for an address space corresponding to the user name; adding the counted uplink and downlink traffics to the daily and/or the monthly traffic of surfing the network for the same date recorded in the address space; if there is no address space corresponding to the current user name, allocating an address space corresponding to the user name; when there is no record item on the same date, creating a new traffic data record of the current date; and creating a new traffic data record of the current date after the charging standard is updated; wherein the traffic data include: a date, a daily traffic of surfing the network and/or a monthly traffic of surfing the network.

In the method above, the method further comprises: after the step of updating the traffic data of the current online user stored in the address space in the wireless network card, reading out the monthly traffic of surfing the network from the updated traffic data and comparing the read-out traffic with the monthly traffic quota of a subscriber of a monthly payment service; and automatically indicating a traffic overrun when the monthly traffic of surfing the network exceeds the monthly traffic quota.

To achieve the aim above, the present disclosure further provides a method for automatically calculating a cost of surfing a network, in which an address space for storing traffic data of a user is allocated in a wireless network card, the method comprises the following steps of:

monitoring any updated charging standard in real time or periodically after a client terminal accesses the network; within a preset counting period, counting uplink and downlink traffics after the wireless network card accesses the network, and updating the traffic data corresponding to the current user; and within a preset charging period, calculating the current daily cost of surfing the network and/or the current monthly cost of surfing the network according to a charging standard for surfing the network and the traffic data of the current user.

In the method, the step of monitoring an updated charging standard in real time may comprise: monitoring an updated charging standard of a wireless network operator in real time or periodically, and downloading the updated charging standard to the local client terminal; creating a new traffic data record by the client terminal after receiving the updated charging standard, wherein the traffic data include: a date, a daily traffic of surfing the network and its corresponding charging standard, and/or a monthly traffic of surfing the network and its corresponding charging standard; the counting period is consistent with the charging period.

In the method above, the step of updating the traffic data corresponding to the current user may be as follows: updating the traffic data of the current online user stored in the address space in the wireless network card according to the date, a charging standard and the calculated uplink and downlink traffics; specifically, this step may comprise: searching, according to the user name and the password used in the current access of the wireless network card to the network, the flash memory of the wireless network card for an address space corresponding to the user name; adding the counted uplink and downlink traffics to the daily traffic of surfing the network and/or monthly traffic cost of surfing the network of the current online user stored in the address space in the wireless network card; and, after calculating the current daily and/or the current monthly cost of surfing the network, updating and displaying the current daily cost of surfing the network and/or the current monthly cost of surfing the network.

Accordingly, the present disclosure further provides a device for traffic counting, the device comprises: a wireless network card and a wireless connection management module, wherein the wireless network card is configured to access the network and store the traffic data of a user; and the wireless connection management module is configured to count, within each counting period, uplink and downlink traffics after the wireless network card accesses the network, and update a daily traffic of surfing the network and/or a monthly traffic of surfing the network stored in the wireless network card corresponding to the current online user.

In the device above, the wireless connection management module is specifically configured to: add the counted uplink and downlink traffics to the daily traffic of surfing the network and/or the monthly traffic of surfing the network stored in the wireless network card corresponding to the current online user name according to the date, a charging standard and the counted uplink and downlink traffics.

Accordingly, the present disclosure further provides a device for automatically calculating a cost of surfing a network, the device comprises: a wireless network card, a wireless connection management module, and a charging module, wherein the wireless network card is configured to access the network and store the traffic data of a user; the wireless connection management module is configured to count, within each counting period, uplink and downlink traffics after the wireless network card accesses the network, and update the traffic data of the current online user stored in the wireless network card; and the charging module is configured to monitor an updated charging standard in real time, inform the wireless connection management module of an updated charging standard, and calculate the current daily cost of surfing the network and/or the current monthly cost of surfing the network.

In the device, the charging module may comprise: a monitoring unit, an informing unit, and a calculation unit, wherein the monitoring unit is configured to monitor an updated charging standard in real time; the informing unit is configured to inform the wireless connection management module of the updated charging standard monitored by the monitoring unit; the calculation unit is configured to calculate the current daily and/or the current monthly cost of surfing the network during the current access according to the traffic data updated by the wireless connection management module and the updated charging standard monitored by the monitoring unit; the charging module may further comprise: an updating and displaying unit, which is configured to update the current daily and/or the current monthly cost of surfing the network and display the updated current daily and/or monthly cost of surfing the network to the user; and the monitoring unit is further configured to store the updated charging standard monitored locally.

In the device above, the wireless connection management module may comprise: a counting unit and an updating unit, wherein the counting unit is configured to count, within each counting period, uplink and downlink traffics after a wireless network card accesses the network; the updating unit is configured to update the traffic data of the current online user according to the date, the charging standard monitored by the monitoring unit and the uplink and downlink traffics counted by the counting unit; and the wireless connection management module may further comprise: a determining and alerting unit, which is configured to determine whether the monthly traffic of surfing the network of a subscriber of a monthly payment service exceeds a monthly traffic quota and sending a traffic overrun alert to the subscriber of a monthly payment service when the monthly traffic of surfing the network of the subscriber exceeds the monthly traffic quota.

It can be seen from the technical solution above that, by recording the traffic cost of surfing the network during each network access of a user in an address space in a wireless network card corresponding to the user, the present disclosure can accurately calculate the daily traffic of surfing the network and/or monthly traffic of surfing the network caused by the surfing of the user through multiple computers with the same wireless network card, automatically update the charging standard of a wireless network operator, and calculate the cost of surfing the network according to the relevant charging standard and provide the calculated cost of surfing the network to the user. By operating a wireless connection management module and a charging module locally, a user can clearly know the current daily traffic of surfing the network and its corresponding cost of surfing the network and/or the current monthly traffic of surfing the network and its corresponding cost of surfing the network. In this way, the present disclosure solves the problem that it is difficult to accurately calculate the cost of surfing the network as the updated charging standard of a wireless network operator cannot be acquired in time.

Moreover, for different users using the same wireless network card, the present disclosure can record the traffics and costs of surfing the network for different users differently, for instance, as different users have different user names and passwords assigned by different network operators, the traffic data of surfing the network for each user can be stored in the wireless network card respectively according to the user name used for accessing the network. In this way, the traffics and fees of surfing the network for different users can be counted and calculated respectively even if they use the same wireless network card, which facilities the charging of network operators.

Moreover, for a subscriber of a monthly payment service, the present disclosure can alert the user whether the traffic of surfing the network has exceeded a monthly traffic quota in time, so that the user can learn about the cost of surfing the network in time when the traffic of surfing the network exceeds the monthly traffic quota, thereby avoiding the situation that a user has to pay extra fee of surfing the network for overrun.

BRIEF DESCRIPTION OF THE DRAWINGS

The drawings mentioned herein are intended to provide a further understanding of the present disclosure and constitute a part of this application. The exemplary embodiments of the present disclosure and the descriptions thereof are intended to explain the present disclosure but not to limit the present disclosure. Among the drawings.

DETAILED DESCRIPTION

Function Overview

In consideration of the fact that it is difficult to accurately count the traffic of surfing the network for a wireless network card in existing technologies, which results in a difficulty in the accurate calculation of the cost of surfing the network, an embodiment of the present disclosure provide a solution for traffic counting and the automatically calculating the cost of surfing the network, the basic idea of which is that: a traffic of surfing the network for accessing network with a same wireless network card is counted and then stored in the wireless network card, a charging standard of a wireless network operator is updated automatically, and the current daily/monthly traffic of surfing the network and fee of surfing the network are accurately calculated according to a charging standard corresponding to traffic data and then provided to the user.

In order to make the foregoing aim, characteristics and advantages of the present disclosure more clear and understandable, the present disclosure is further described in detail by reference to appended drawings in combination with specific embodiments. It should be noted that the embodiments of the present disclosure and the characteristics in the embodiments may be combined with each other if no conflict is caused.

Embodiments of the Method

Figure 1A:
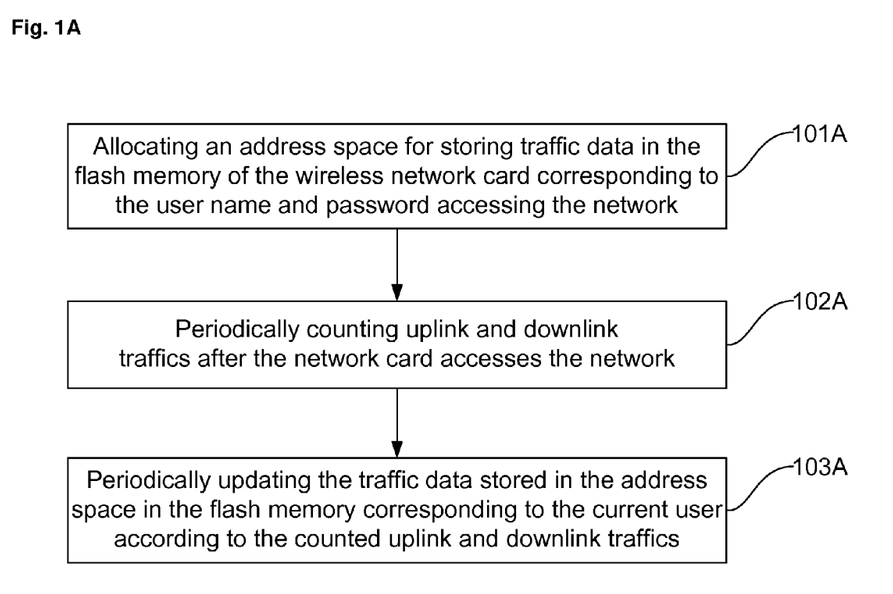
FIG. 1A is a schematic diagram illustrating the process of the method for traffic counting in an embodiment of the present disclosure.

FIG. 1A is a schematic diagram illustrating the process of the method for traffic counting in an embodiment of the present disclosure. As shown in FIG. 1A, the method for traffic counting comprises the following specific steps:

step 101A: allocating, in a flash memory of a wireless network card, an address space for storing traffic data corresponding to a user name and a password accessing the network;

when accessing the network with a wireless network card, a client terminal needs to use a wireless connection management module to conduct operations such as network searching, access authentication, and counting the traffic of surfing the network. In this embodiment, the address space for storing traffic data is allocated in the flash memory of the wireless network card by the users or the wireless connection management module on the client terminal to store traffic data of surfing the network for different users and a file path of a charging standard of the wireless network operator corresponding to the traffic data;

in order to easily store the traffic data of surfing the network for different users accessing the network with the same wireless network card, the address space can be divided into several sub-address spaces according to different user names and passwords, and an address space for storing traffic data is allocated respectively for each user using the wireless network card; here, the method of dynamic space allocation is adopted, for instance, if only one user uses the wireless network card, the address space will be fully allocated to this user; if two users use the wireless network card, the address space will be allocated to the two users half by half, and so on and so forth; of course, the differentiation may also be achieved through the range of the storage address or by using other identifiers instead of allocating sub-address spaces;

only after matching user name and password are input can the wireless network connection management module access the network, acquire the uplink and download traffics of surfing the network, and conduct operations on the traffic data of the user, such as traffic data reading and updating according to the need of the user; each traffic data generally includes: a date, a daily traffic of surfing the network and a file path of the charging standard corresponding to the daily traffic data, and/or a monthly traffic of surfing the network and a file path of the charging standard corresponding to the monthly traffic data;

the file path of the charging standard is contained in the traffic data to provide the charging standard to calculate the cost of surfing the network and to acquire a timely updated charging standard file of the wireless network operator from the server; if there is no need to calculate the cost of surfing the network, then it is not necessary to contain the file path of the charging standard in the traffic data; if it is necessary to calculate the cost of surfing the network, an address space should be allocated to the charging standard in the wireless network card, so that the cost of surfing the network can be calculated and the charging standard updated subsequently;

moreover, when multiple users access the network with the same wireless network card, address spaces corresponding to different user names and dates are allocated respectively in the wireless network card according to the user names and passwords; when the traffic of surfing the network is counted later after the network is accessed, the counted traffic data of surfing the network will be stored in the address space corresponding to the current online user name; that is, if there is no address space corresponding to the current user name, an address space corresponding to the user name will be allocated; moreover, when the wireless network card is powered off, the data stored in the flash memory will not be lost;

step 102A: counting periodically uplink and downlink traffics after the wireless network card accesses the network;

here, the client terminal first activates the wireless connection management module and a wireless network card device is inserted the client terminal, and then searches for a network with the wireless connection management module and enables the wireless network card to access the network by operations such as authentication, wherein the wireless connection management module manages the operations, such as user authentication and counting the traffic of surfing the network, by which the wireless network card accesses the network; in the process, the wireless connection management module periodically acquires the uplink and downlink traffics of surfing the network with the wireless network card, and adds the uplink and downlink traffics of surfing the network for this network access to the record on the traffic of surfing the network corresponding to the current online user name respectively by day and by month so as to count the daily traffic of surfing the network and/or monthly traffic of surfing the network for the current online user;

the traffic data and the daily traffic of surfing the network and/or the monthly traffic of surfing the network corresponding to a date and/or month may be respectively recorded in the form of a list, in which, for example, the horizontal column represents a day and/or a month, and the vertical column represents a file catalog of a corresponding traffic and charging standard; the horizontal column will increase with the change of accessing a day and/or a month;

in the process, a period during which the uplink and downlink traffics are counted periodically is called a counting period which is generally set to be 10 seconds to 60 seconds, because if the counting period is too short, the rate of wireless network card reading/writing will be too high, which will result in the heating-up of a network card device; however, if the counting period is set too long, the traffic data cannot be updated in time;

and step 103A: periodically updating the traffic data stored in the address space corresponding to the current user in the flash memory according to the counted uplink and downlink traffics;

In this step, after acquiring the uplink and downlink traffics of surfing the accessed network, the wireless connection management module periodically updates the traffic data stored in the address space of the flash memory corresponding to the current user, which mainly aims to, within a preset counting period, search the flash memory of the wireless network card for an address space corresponding to the user name according to the user name for the current network access, and then add the counted uplink and downlink traffics to the daily traffic of surfing the network and/or monthly traffic of surfing the network for the same date recorded in a sub-address space respectively by a day, by a month and by a charging standard to count the daily and/or monthly traffic of surfing the network. If there is no record item on the same date, a new record on the traffic of the current day is created; when the charging standard is updated, a new record on the traffic of the current day is created. When a daily and/or monthly traffic of surfing the network is/are needed, the traffic data will be read from the wireless network card. If there is no address space corresponding to the user name, an enough address space will be allocated in the flash memory of the wireless network card dynamically according to the user name and password, and all the traffic data corresponding to the user name and password will be stored in the address space thereafter.

Figure 1B:
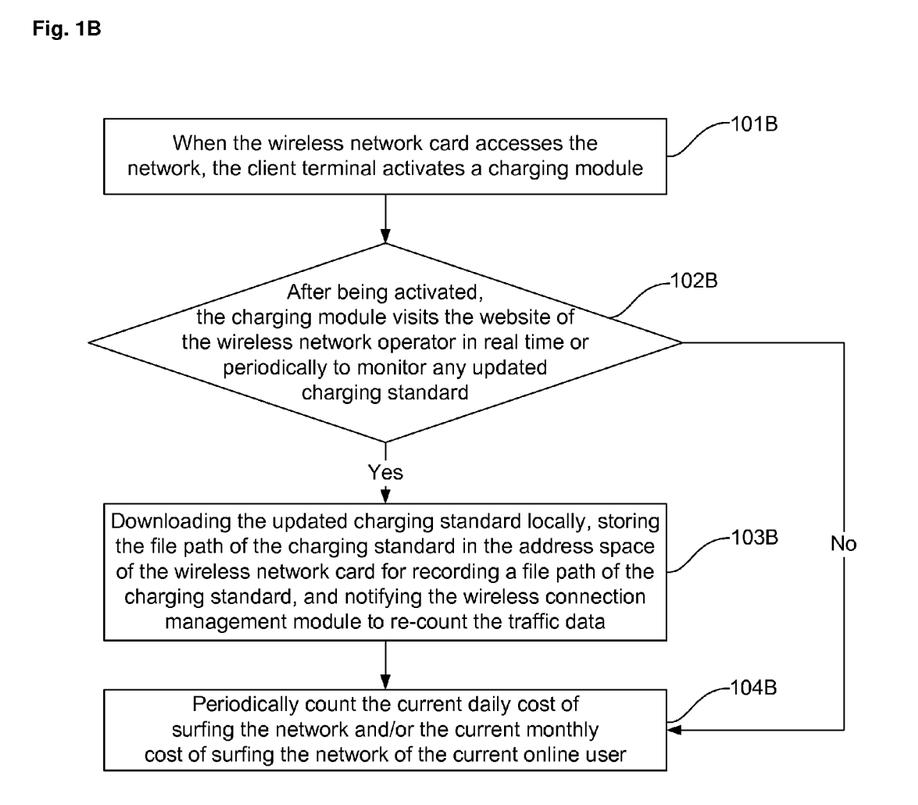
FIG. 1B is a schematic diagram illustrating the process of the method for automatically calculating the cost of surfing a network in an embodiment of the present disclosure.

The procedures described above are the process of realization of a traffic counting; if it is further needed to calculate the cost of surfing the network on this basis, then the user can locally run the wireless connection management module and the charging module accurately to calculate the daily/monthly cost of surfing the network in time through calculations according to the counted traffic of surfing the network and the automatically updated charging standard of the wireless network operator. As shown in FIG. 1B, the automatic calculation process for the cost of surfing the network specifically comprises the following steps:

step 101B: the client terminal activates the charging module when the wireless network card accesses the network;

in this step, the charging module can monitor and update the charging standard of the network operator and calculate the cost of surfing the network of the user according to the traffic of surfing the network for the user and a corresponding charging standard; in this embodiment, a piece of software for calculating the cost of surfing the network is programmed and stored on a server; if the client terminal has not installed the charging module, a piece of software for calculating the cost of surfing the network corresponding to the charging module can be downloaded from the server and then installed; the software, which is the charging module of the client terminal, can be triggered and activated by the wireless connection management module after the network is accessed;

step 102B: after being activated, the charging module monitors an updated charging standard on the website of the wireless network operator in real time or periodically; step 103B will be executed if there is any updated charging standard, otherwise, step 104B will be executed;

step 103B: automatically downloading the updated charging standard locally, storing the file path of the charging standard in an address space in the wireless network card for recording the file path of the charging standard, and notifying the wireless connection management module to recount traffic data, and then executing step 104B;

in this step, after monitoring an updated charging standard, the charging module automatically downloads the updated charging standard locally and stores the downloaded charging standard at a location appointed by the user;

step 104B: periodically calculating the daily and/or monthly cost of surfing the network of the current online user.

in this step, the cycle during which the cost of surfing the network is periodically calculated, updated and displayed is called a charging period, which is generally set to be 10 seconds to 60 seconds, and which may be consistent with the counting period during which the wireless connection management modules stores traffic data; the charging module can monitor and download the updated charging standard of the wireless network operator from the server in real time and read the updated traffic record from the wireless network card during the charging period to calculate the current daily cost of surfing the network and/or the current monthly cost of surfing the network for this current network access according to the traffic and a corresponding charging standard.

Specifically, within a preset charging period, the daily and/or monthly traffic of surfing the network for the user and a corresponding charging standard are read from the flash memory of the wireless network card, and then the current daily network access fee and/or the current monthly cost of surfing the network of the user are/is calculated. Here, taking the calculation of the cost of surfing the network according to monthly traffic of surfing the network as an example: assuming that the current monthly traffic of surfing the network is X KB and the charging standard is updated once in the current month, wherein the traffic of surfing the network is $X_1$ KB and the charging standard is RMB $Y_1$/KB before updating, and the traffic of surfing the network is $X_2$ KB and the updated charging standard is RMB $Y_2$/KB, wherein $X_1+X_2=X$, then, the current monthly cost of surfing the network should be: $X_1*Y_1+X_2*Y_2$. In addition, after the calculation, the charging module displays the result of the calculated the cost of surfing the network to the user at a fixed time.

Moreover, the result of the calculation is sent to the wireless connection management module and displayed in the user interface of the module for the user to browse. When the user is offline, the daily traffic and cost of surfing the network and/or the monthly traffic and cost of surfing the network if the latest period may be calculated. In this way, the problem is avoided that the cost of surfing the network corresponding to the last traffic of surfing the network is not calculated within the last counting period are not calculated after the user is offline.

Embodiment 1

Figure 2:
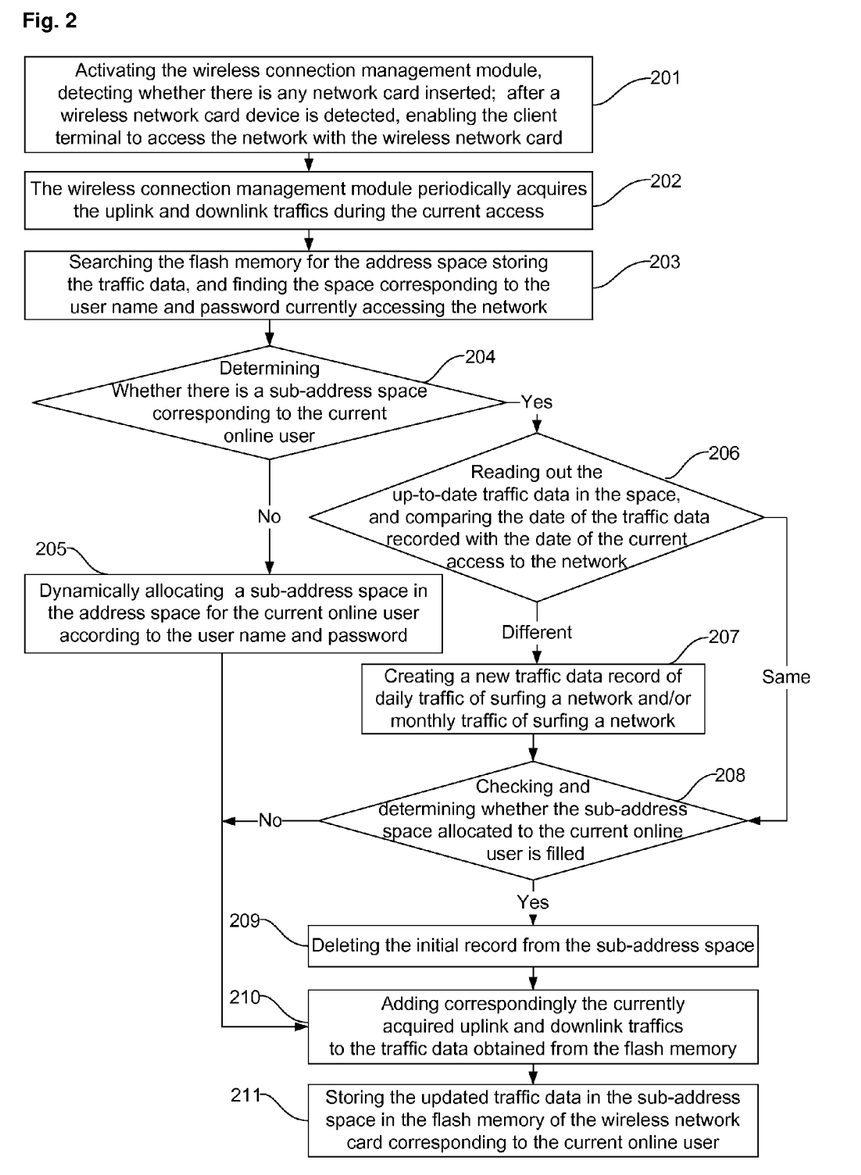
FIG. 2 is a schematic diagram illustrating an example of the method for traffic counting in an embodiment of the present disclosure.

This embodiment is mainly used for counting the current daily and/or monthly traffic of surfing the network, monitoring and updating a charging standard of surfing the network in real time, and calculating the current daily cost of surfing the network and/or the current monthly cost of surfing the network according to the daily and/or the monthly traffic of surfing the network and a charging standard of surfing the network and providing the calculated result to the user. As shown in FIG. 2, the wireless connection management module counts the daily and/or monthly traffic of surfing the network and store the result of counting in the flash memory of the network card, this process comprises the following steps:

step 201: activating a wireless connection management module; monitoring whether or not there is any wireless network card inserted, and enabling the a client terminal to access the network when a wireless network card device is monitored;

after the authentication messages such as user name and password are input via the wireless connection management module, a connection is established between the client terminal and the network. In this embodiment of the present disclosure, there is no limit as to the sequence of the activation of the wireless connection management module and the insertion of the wireless network card;

step 202: the wireless connection management module periodically acquires uplink and downlink traffics of surfing the current accessed network;

step 203: searching the address space used for storing the traffic data in the flash memory for a space corresponding to the user name and password for the current access;

in this step, searching the flash memory of the wireless network card for an address space corresponding to the user name according to the user name and password for the current access to the network with the wireless network card.

step 204: determining whether there is a sub-address space corresponding to the user name for the current access; if the user name does not exist, executing step 205; otherwise, executing step 206;

step 205: dynamically allocating a sub-address space from the address space for the current online user according to the user name and password, and executing step 210;

if there is no address space corresponding to the current user name, an address space corresponding to the user name will be allocated; or, if there is no record on the current day, a new traffic data record will be created for the current day; after the charging standard is updated, a new traffic data record will be created for the current day. All the traffic data corresponding to the user name and password for the current network access will be stored in the address space.

step 206: reading out the up-to-date traffic data from the space, and comparing the date of the recorded traffic data with the date of the current network access; if the two dates are different, executing step 207; if the two dates are the same, executing step 208;

step 207: creating a new traffic data record on daily traffic of surfing the network and/or monthly traffic of surfing the network and executing step 208;

if the two dates are different, or if a notice on an update of the charging standard of the operator is received from the charging module, a new record is created to record the daily traffic of surfing the network and/or the monthly traffic of surfing the network, instead of adding them to the traffic data read out from the flash memory;

it should be noted that, if it is necessary to calculate the cost of surfing the network and a notice on an update of the charging standard is received from the charging module before the acquired uplink and downlink traffics are correspondingly added to the traffic data read out from the flash memory, then this step is carried out and a new traffic data record is created. If no notice on an update of the charging standard is received from the charging module, there is no need to create a new traffic data record, and instead, the counted daily traffic of surfing the network and/or the monthly traffic of surfing the network acquired are/is correspondingly added to the traffic data read out from the flash memory.

step 208: detecting and determining whether the sub-address space allocated to the current online user is filled, executing step 209 if the sub-address space is full, otherwise, executing step 210;

step 209: deleting the oldest record from the sub-address space and then executing step 210;

step 210: correspondingly adding the currently acquired uplink and downlink traffics to the traffic data read from the flash memory and executing step 211;

here, the currently acquired uplink and downlink traffics, for example, the daily traffic of surfing the network and/or the monthly traffic of surfing the network, are correspondingly added to the flash memory of the wireless network card. Specifically, the daily traffic of surfing the network and/or monthly traffic of surfing the network are/is added to the traffic data read from the flash memory of the wireless network card in a manner of corresponding to the current user, date and charging standard to achieve an update on the traffic data. For a newly created traffic data record, the read traffic data record may be zero, and the counted daily and/or monthly traffic of surfing the network may be added directly to the traffic data record.

step 211: storing the updated traffic data in sub-address space of the flash memory of the wireless network card corresponding to the current online user, wherein the updated traffic data comprise: a date and a daily and/monthly traffic of surfing the network; if charging is needed, the updated traffic data further comprise the file path of a charging standard corresponding to the traffic data.

The description above is the process of the calculation of daily and monthly traffics of surfing the network. For a subscriber of a monthly payment service, the current monthly traffic of surfing the network is mainly acquired, whether or not the current traffic of surfing the network exceeds a monthly traffic quota can be determined by comparing the monthly traffic of surfing the network with the monthly traffic quota. And, once the monthly traffic quota is exceeded, the wireless management module will alert the user that the current monthly traffic has exceeded the quota. In the following, the process a traffic counting for a subscriber of a monthly payment service is further described by reference to the embodiment of the method for a traffic counting disclosed in the present disclosure.

Embodiment 2

The specific steps of the process of traffic counting for a subscriber of a monthly payment service are as follows in this embodiment:

steps 301~310: steps which are substantially identical to the steps 201~210 in Embodiment 1 and the specific realization process can be understood by reference to the descriptions above, no repeated descriptions is given here; and step 311: comparing the monthly traffic of surfing the network with the monthly traffic quota for the user; if the current monthly traffic of surfing the network has exceeded the monthly traffic quota, informing the user of the overrun of the current month.

This embodiment is very useful for a subscriber of a monthly payment service. Particularly, as the 3G network is used widely and the rate of surfing the network has been increased greatly, a timely alerting on an overflow becomes more important.

Figure 3:
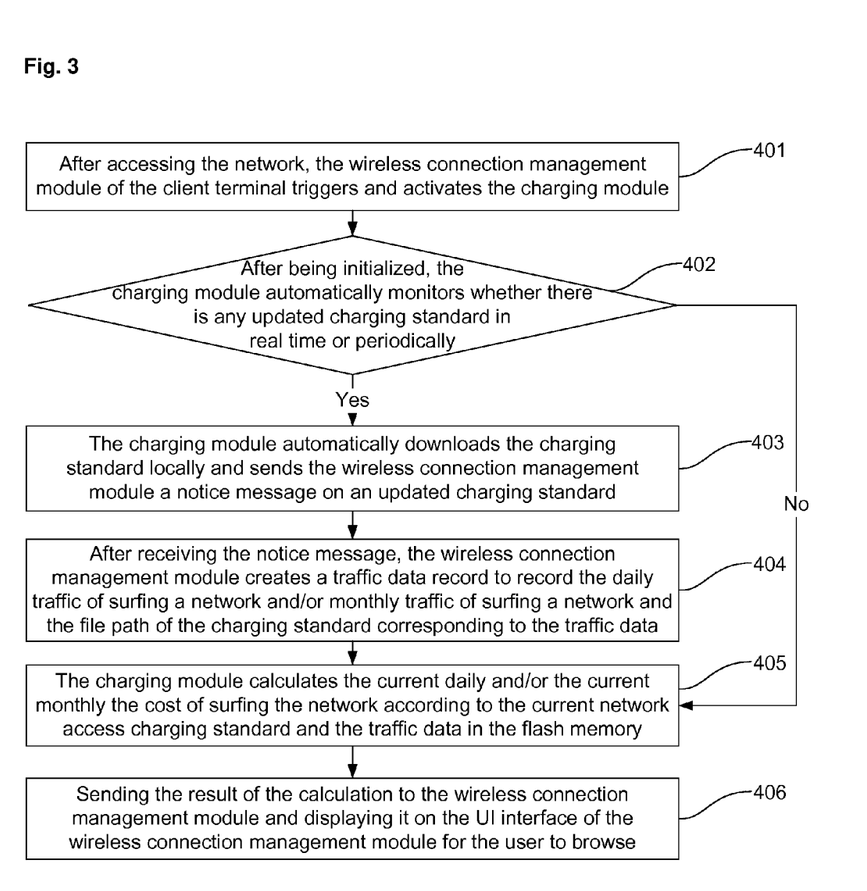
FIG. 3 is a schematic diagram illustrating an example of the method for automatically calculating the cost of surfing a network in an embodiment of the present disclosure.

The cost of surfing the network of the user is calculated according to the counted traffic data and an up-to-date charging standard of the wireless network operator. FIG. 3 shows a schematic diagram illustrating the flow of the method disclosed in the present disclosure for automatically calculating the cost of surfing the network, specifically, the flow comprises the following steps:

step 401: after accessing the network, the wireless connection management module at a client terminal triggers and activates a charging module;

step 402: after being activated, the charging module automatically monitors on whether there is an updated charging standard in real time or periodically; if there is an updated charging standard, step 403 will be executed; and if there is no updated charging standard, step 405 will be executed;

after being initialized, the charging module automatically visits the website of the wireless network operator in real time to monitor an updated charging standard;

step 403: the charging module automatically downloads the updated charging standard locally, and sends a notice message about the updated charging standard monitored to the wireless connection management module;

step 404: after receiving the notice message, the wireless connection management module creates a new traffic data record to record the daily and/or the monthly traffic of surfing the network and the file path of a charging standard corresponding to the traffic data;

after being activated, the wireless connection management module checks in real time or periodically to determine whether the charging module monitors a notice message on an updated charging standard;

step 405: the charging module calculates the current daily and/or the current monthly cost of surfing the network according to the current charging standard for surfing the network and the traffic data in the flash memory, and then executing step 406;

The charging module reads the daily and/or monthly traffic of surfing the network and a corresponding charging standard corresponding to the user name and password used for the current network access periodically from the flash memory of the wireless network card so as to calculate the current daily and/or the current monthly cost of surfing the network for the user.

Specifically, the process that the charging module calculates the cost of surfing the network is as follows: the charging module searches the flash memory for an address space for storing traffic data at the arrival of a charging period, finds, according to the input user name and password, the sub-address space in the flash memory corresponding to the user name and password, reads out the record on the traffic data of the current day or month from the sub-address space according to the current date, acquires the file path of the charging standard corresponding to the current daily and/or the current monthly traffic data from the list of record items, calculates the daily cost of surfing the network of the user according to the corresponding charging standard, and accumulates the daily costs of surfing the network to obtain the current monthly cost of surfing the network;

step 406: the result of the calculation is sent to the wireless connection management module and displayed on the IU interface of the wireless connection management module for the user to browse.

In order to describe the embodiments above briefly, these embodiments are described as a series of actions. However, for those skilled in the art, it should be understood that the present disclosure is not limited to the sequence of the actions described herein, because according to the present disclosure, some of the steps may be executed in a different order or at the same time.

According to the embodiments of the present disclosure, there is also provided a computer-readable medium, on which computer-executable instructions are stored. When these instructions are executed by a computer or processor, the computer or processor will execute the steps shown in FIG. 1A to FIG. 3, and preferably, one or more of the embodiments of the foregoing method will be executed.

Embodiments of Device

According to the embodiments of the present disclosure, the present disclosure provides a device for traffic counting to realize the foregoing method. The device comprises: a wireless network card and a wireless connection management module, wherein the wireless network card is configured to access the network and store the traffic data of a user;

and the wireless connection management module is configured to count, within each counting period, uplink and downlink traffics after the wireless network card accesses the network, and update the daily traffic of surfing the network and/or monthly traffic of surfing the network stored in the wireless network card corresponding to the current online user name;

wherein the wireless connection management module is specifically configured to: add the counted uplink and downlink traffics to the daily and/or monthly traffics of surfing the network stored in the wireless network card corresponding to the current online user name according to the date, a charging standard and the counted uplink and downlink traffics.

Figure 4:
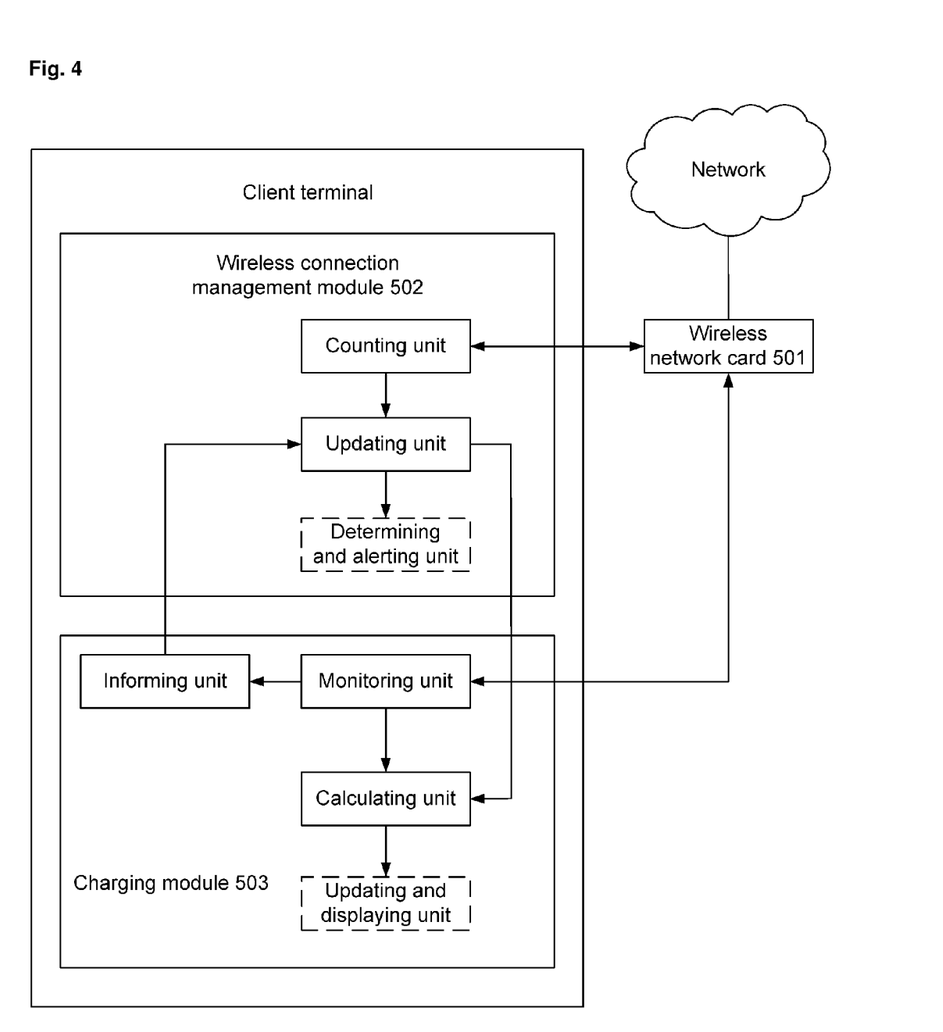
FIG. 4 is a schematic diagram illustrating the structure of the device for counting a traffic and automatically calculating the cost of using a network in an embodiment of the present disclosure.

Accordingly, an embodiment of the present disclosure further provides a device for automatically calculating a cost of surfing a network. As shown in FIG. 4, the device comprises: a wireless network card 501, a wireless connection management module 502, and a charging module 503, wherein the wireless network card 501 is configured to access the network and store the traffic data of a user;

the wireless connection management module 502 is configured to count, within each counting period, the uplink and downlink traffics after the wireless network card accesses the network, and update the traffic data of the current online user stored in the wireless network card;

the charging module 503 is configured to monitor an updated charging standard in real time, inform the wireless connection management module of an updated charging standard, and calculate the current daily and/or the current monthly cost of surfing the network.

In the foregoing device, the charging module 503 comprises: a monitoring unit, an informing unit, and a calculation unit, wherein the monitoring unit is configured to monitor an updated charging standard in real time;

the informing unit is configured to inform the wireless connection management module of the updated charging standard monitored by the monitoring unit;

and the calculation unit is configured to calculate the current daily and/or the current monthly cost of surfing the network of the current online user according to the traffic data updated by the wireless connection management module 502 and the updated charging standard monitored by the monitoring unit.

The charging module 503 further comprises:

an updating and displaying unit, which is configured to update the current daily and/or the current monthly cost of surfing the network and display the updated current daily and/or the current monthly cost of surfing the network to the user;

the monitoring unit is also configured to store a monitored updated charging standard locally.

The wireless connection management module 502 may comprise: a counting unit and an updating unit, wherein the counting unit is configured to count, within each counting period, uplink and downlink traffics after a wireless network card accesses the network;

and the updating unit is configured to update the traffic data of the current online user according to the date, the charging standard monitored by the monitoring unit and the uplink and downlink traffics counted by the counting unit.

The wireless connection management module further comprises:

a determining and alerting unit, which is configured to determine whether the monthly traffic of surfing the network for a subscriber who has a monthly payment service exceeds a monthly traffic quota and sending a traffic overrun alert to the subscriber if the monthly traffic of surfing the network of the subscriber exceeds the monthly traffic quota.

In summary, the solution for traffic counting and automatically calculating the cost of surfing the network provided in the embodiment of the present disclosure can accurately count the traffic of surfing the network for accessing the network via multiple computers with one wireless network card.

Moreover, the realization of the present disclosure makes no modification to existing system structure and realization flow. Therefore, it is easy to realize the present disclosure and convenient to popularize the present disclosure in the related technical field, and the present disclosure has high industrial applicability.

Each of the foregoing embodiments is particularly emphasized in a certain aspect. For the part not stated in detail in an embodiment, the reader can refer to relevant description in other embodiments. The embodiments above are only preferred ones of the present disclosure, which are only intended to illustrate and explain but not to limit the scope of protection of the present disclosure. It should be noted that the embodiments of the present disclosure and the characteristics thereof may be combined if no conflict is caused. All modifications, replacements and improvements made without departing from the spirit and principle of the present disclosure shall be within the protection scope of the present disclosure.

What is claimed is:

1. A method for traffic counting, an address space for storing traffic data of a user is allocated in a wireless network card, the method comprising:

within a preset counting period, counting uplink and downlink traffics after the wireless network card accesses network, and updating the traffic data of a current online user stored in the address space in the wireless network card;

wherein the step of updating the traffic data of the current online user stored in the address space in the wireless network card is as follows: updating the traffic data of the current online user stored in the address space in the wireless network card according to a date, a charging standard, and the counted uplink and downlink traffics, specifically, this step comprises:

searching, according to a user name and a password used in the current access of the wireless network card to the network, the flash memory of the wireless network card for an address space corresponding to the user name;

adding the counted uplink and downlink traffics to a daily traffic of surfing the network and/or a monthly traffic of surfing the network for the same date recorded in the address space;

when there is no address space corresponding to the current user name, allocating an address space corresponding to the user name;

when there is no record item on the same date, creating a new traffic data record of the current date; and creating a new traffic data record of the current date after the charging standard is updated;

wherein the traffic data include: a date, a daily traffic of surfing the network and/or a monthly traffic of surfing the network.

2. The method for traffic counting according to claim 1, the method further comprising:

after updating the traffic data of the current online user stored in the address space in the wireless network card, reading out the monthly traffic of surfing the network from the updated traffic data, and comparing the read-out traffic with the monthly traffic quota of a subscriber of a monthly payment service; and automatically indicating a traffic overrun when the monthly the traffic of surfing the network exceeds the monthly traffic quota.

3. A method for automatically calculating a cost of surfing a network, an address space for storing traffic data of a user is allocated in a wireless network card, the method comprising:

monitoring an updated charging standard in real time or periodically after a client terminal accesses network;

within a preset counting period, counting uplink and downlink traffics after the wireless network card accesses the network, and updating the traffic data corresponding to a current user; and within a preset charging period, calculating a current daily cost of surfing the network and/or a current monthly cost of surfing the network according to a charging standard for surfing the network and the traffic data of the current user;

wherein the step of updating the traffic data corresponding to the current user is as follows: updating the traffic data of the current online user stored in the address space in the wireless network card according to the date, a charging standard and the calculated uplink and downlink traffics; specifically, this step comprises:
  searching, according to a user name and a password used in the current access of the wireless network card to the network, the flash memory of the wireless network card for an address space corresponding to the user name;
  adding the counted uplink and downlink traffics to the daily traffic of surfing the network and/or the monthly traffic of surfing the network for the current online user stored in the address space in the wireless network card; and
  after calculating the current daily cost of surfing the network and/or the current monthly cost of surfing the network, updating and displaying the current daily and/or the current monthly cost of surfing the network.

4. The method for automatically calculating the cost of surfing the network according to claim 3, wherein the step of monitoring an updated charging standard in real time comprises:
  monitoring an updated charging standard of a wireless network operator in real time or periodically, and downloading the updated charging standard to a local client terminal; and creating a new traffic data record by the client terminal after receiving the updated charging standard;
  wherein the traffic data include: a date, a daily traffic of surfing the network and its corresponding charging standard, and/or a monthly traffic of surfing the network and its corresponding charging standard; the counting period is consistent with the charging period.

5. A device for traffic counting, comprising: a wireless network card and a wireless connection management module, wherein
  the wireless network card is configured to access network and store traffic data of a user; and
  the wireless connection management module is configured to count, within each counting period, uplink traffic and downlink traffic after the wireless network card accesses the network, and update a daily traffic of surfing the network and/or a monthly traffic of surfing the network stored in the wireless network card corresponding to the current online user name;
  the wireless connection management module is further configured to:
  update the traffic data of the current online user stored in the address space in the wireless network card according to a date, a charging standard, and the counted uplink and downlink traffics;
  search, according to a user name and a password used in the current access of the wireless network card to the network, the flash memory of the wireless network card for an address space corresponding to the user name;
  add the counted uplink and downlink traffics to a daily traffic of surfing the network and/or a monthly traffic of surfing the network for the same date recorded in the address space;
  when there is no address space corresponding to the current user name, allocate an address space corresponding to the user name;
  when there is no record item on the same date, create a new traffic data record of the current date; and create a new traffic data record of the current date after the charging standard is updated;
  wherein the traffic data include: a date, a daily traffic of surfing the network and/or a monthly traffic of surfing the network.

6. The device for traffic counting according to claim 5, wherein the wireless connection management module is specifically configured to:
  add the counted uplink traffic and downlink traffic to the daily traffic of surfing the network and/or the monthly traffic of surfing the network stored in the wireless network card corresponding to the current online user name according to the date, a charging standard and the counted uplink and downlink traffics.

7. A device for automatically calculating a cost of surfing a network, comprising: a wireless network card, a wireless connection management module, and a charging module, wherein
  the wireless network card is configured to access the network and store the traffic data of a user;
  the wireless connection management module is configured to count, within each counting period, uplink and downlink traffics after the wireless network card accesses the network, and update the traffic data of the current online user stored in the wireless network card; and
  the charging module is configured to monitor an updated charging standard in real time, inform the wireless connection management module of an updated charging standard, and calculate the current daily cost of surfing the network and/or the current monthly cost of surfing the network;
  the wireless connection management module is further configured to:
  update the traffic data of the current online user stored in the address space in the wireless network card according to the date, a charging standard and the calculated uplink and downlink traffics;
  search, according to a user name and a password used in the current access of the wireless network card to the network, the flash memory of the wireless network card for an address space corresponding to the user name;
  add the counted uplink and downlink traffics to the daily traffic of surfing the network and/or the monthly traffic of surfing the network for the current online user stored in the address space in the wireless network card; and
  calculate the current daily cost of surfing the network and/or the current monthly cost of surfing the network;
  update and display the current daily and/or the current monthly cost of surfing the network.

8. The device for automatically calculating the cost of surfing the network according to claim 7, wherein the charging module comprises: a monitoring unit, an informing unit, and a calculation unit, wherein
  the monitoring unit is configured to monitor an updated charging standard in real time;
  the informing unit is configured to inform the wireless connection management module of the updated charging standard monitored by the monitoring unit;
  the calculation unit is configured to calculate the current daily cost of surfing the network and/or the current monthly cost of surfing the network during the current accessing according to the traffic data updated by the wireless connection management module and the updated charging standard monitored by the monitoring unit;
  the charging module further comprises:
  an updating and displaying unit, which is configured to update the current daily and/or the current monthly cost of surfing the network and display the updated current/current daily and/or monthly cost of surfing the network to the user; and the monitoring unit is further configured to store the updated charging standard monitored locally.

9. The device for automatically calculating the cost of surfing the network according to claim 8, wherein the wireless connection management module comprises:
a counting unit and an updating unit, wherein
the counting unit is configured to count, within each counting period, uplink and downlink traffics after a wireless network card accesses the network;
the updating unit is configured to update the traffic data of the current online user according to a date, a charging standard monitored by the monitoring unit, and the uplink and downlink traffics counted by the counting unit; and
the wireless connection management module further comprises:
a determining and alerting unit, which is configured to determine whether the monthly traffic of surfing the network of a subscriber of a monthly payment service exceeds a monthly traffic quota, and send a traffic overrun alert to the subscriber of a monthly payment service when the monthly traffic of surfing the network of the subscriber exceeds the monthly traffic quota.

* * * * *